Dec. 7, 1965 F. N. PIASECKI 3,222,012
SLIP STREAM DEFLECTOR ASSEMBLY FOR AIRCRAFT
Filed Aug. 29, 1963 4 Sheets-Sheet 1

INVENTOR
Frank N. Piasecki

BY
Mason, Fenwick & Lawrence
ATTORNEYS

Dec. 7, 1965  F. N. PIASECKI  3,222,012
SLIP STREAM DEFLECTOR ASSEMBLY FOR AIRCRAFT
Filed Aug. 29, 1963  4 Sheets-Sheet 2

INVENTOR
Frank N. Piasecki

BY
Mason, Fenwick & Lawrence
ATTORNEYS

Dec. 7, 1965  F. N. PIASECKI  3,222,012
SLIP STREAM DEFLECTOR ASSEMBLY FOR AIRCRAFT
Filed Aug. 29, 1963  4 Sheets-Sheet 3

INVENTOR
Frank N. Piasecki

BY
Mason, Fenwick & Lawrence
ATTORNEYS

Dec. 7, 1965  F. N. PIASECKI  3,222,012
SLIP STREAM DEFLECTOR ASSEMBLY FOR AIRCRAFT
Filed Aug. 29, 1963  4 Sheets-Sheet 4

INVENTOR
Frank N. Piasecki

BY
Mason, Fenwick & Lawrence
ATTORNEYS

United States Patent Office 3,222,012
Patented Dec. 7, 1965

3,222,012
SLIP STREAM DEFLECTOR ASSEMBLY
FOR AIRCRAFT
Frank N. Piasecki, Haverford, Pa., assignor to Piasecki
Aircraft Corporation, Philadelphia, Pa., a corporation
of Pennsylvania
Filed Aug. 29, 1963, Ser. No. 305,269
6 Claims. (Cl. 244—51)

This invention relates to aircraft, and is directed particularly to improved slip stream assemblies for aircraft.

Some thought has been given previously to the use of a ducted pusher propeller on aircraft to provide forward thrust for cruising flight, with the same propeller being capable of working in conjunction with controllable tail vanes to provide the anti-torque force necessary for controlling vertical lift aircraft when hovering. Aircraft having this general construction is disclosed in my co-pending application Serial No. 166,292, filed January 15, 1962. In that application, a shrouded, or ducted, propeller is shown, which will provide forward thrust and anti-torque control, together with means for common control in desired variable ratios of propeller pitch and tail vane deflection.

The general object of the present invention is to provide improved slip stream deflecting structure of the general type disclosed as a tail assembly in the above-mentioned pending application.

A more specific object of the invention is to provide slip stream deflecting structure as mentioned, suitable for a tail assembly and having a novel vane arrangement to facilitate rapid change from forward flight control to anti-torque hovering control positions to effect smooth transition from one flight condition to another.

Another object is the provision of vanes having articulated sections to allow for vane contour, or camber, change with vane angular deflections.

A further object is to provide a slip stream deflector having a series of vanes which can be deflected sharply with considerably increased camber while maintaining free air flow space between the vanes, thus avoiding choking.

A still more specific object of the invention is to provide a deflector assembly including a vane carrying unit which is pivotally connected to the propeller shroud to permit simultaneous adjustment of vane alignment and vane angle.

Other objects of the invention will become apparent from the following description of practical embodiments thereof, when taken in conjunction with the drawings which accompany, and form part of, this specification.

Figure 1:
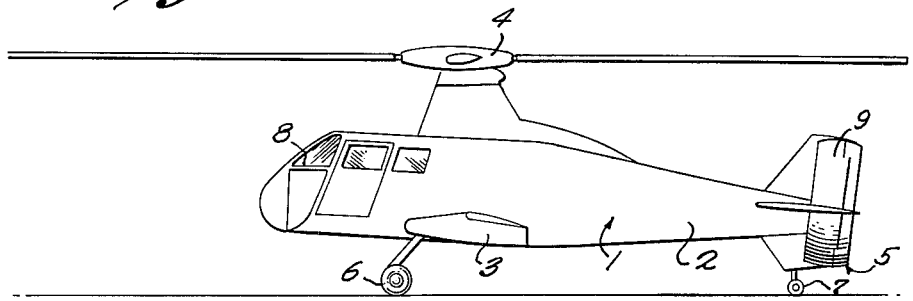
FIGURE 1 is a side elevation of an aircraft embodying the principles of the present invention.

In general, the invention consists in a slip stream deflector assembly for aircraft which is particularly adapted to use as a tail assembly, but is not limited to that use. The assembly includes a propeller mounted in a shroud. The shroud carries a plurality of vanes bridging the propeller slip stream, and providing control surfaces upon which the air moved through the shroud by the propeller can react to control cruising flight direction and provide anti-torque control when hovering. The vanes are carried in such position, or are movable to such position, that the leading edges of the vanes occupy a plane which is at an angle to the plane of the propeller transversely of the aircraft. The several vanes have articulated sections and are movable in unison to change their angle of deflection relative to their support. In some instances, the vane angle relative to the plane of the propeller can be changed by movement of the support upon which the vanes are mounted. The vanes will automatically change camber when their angle is changed relative to their support.

Referring to the drawings in detail, and first turning to FIGURES 1 through 4, there is shown an aircraft 1 having a fuselage 2, wings 3, rotor 4, tail assembly 5 embodying the invention, landing gear 6, and a tail wheel 7. There is the usual cabin 8 at the forward end of the fuselage, which will contain the normal controls for vertical lift type aircraft. The aircraft with the exception of the tail, has been shown somewhat diagrammatically, as the invention lies in the structure shown as the tail assembly.

The tail consists essentially of an annular shroud 9, a propeller 10, and one or more control vanes 11. The shroud is mounted at the rear of the fuselage, coaxial with the propeller shaft, upon supports which form fixed vertical and horizontal stabilizers 12 and 13. The shroud is preferably of airfoil cross-section, and has its trailing edge 14 cut away at the top and bottom to provide a recessed seat 15 for a gate 16 which carries vanes 11.

Gate 16 has upper and lower frame members 17 and 18, which continue the airfoil cross-section of the adjacent shroud areas. There is a central bridging member 19 which lies in the plane of the horizontal stabilizer. The three frame members of the gate are held in proper spaced relation by means of fixed leading sections 20 of the vanes 11. The trailing vane sections 21 are pivotally mounted at 22. With this construction, the upper, lower and central members and the fixed vane sections provide a rigid grid which forms the gate. The gate is hinged to the shroud at one inner corner, as shown at 23. Thus, the gate is swingably movable into and out of the shroud seat 15, and the trailing sections of the vanes are movable relative to the gate. A horizontal trim tab 24 is pivoted to the trailing edge of the central gate frame member 19. This completes the general arrangement of the tail assembly.

Figure 2:
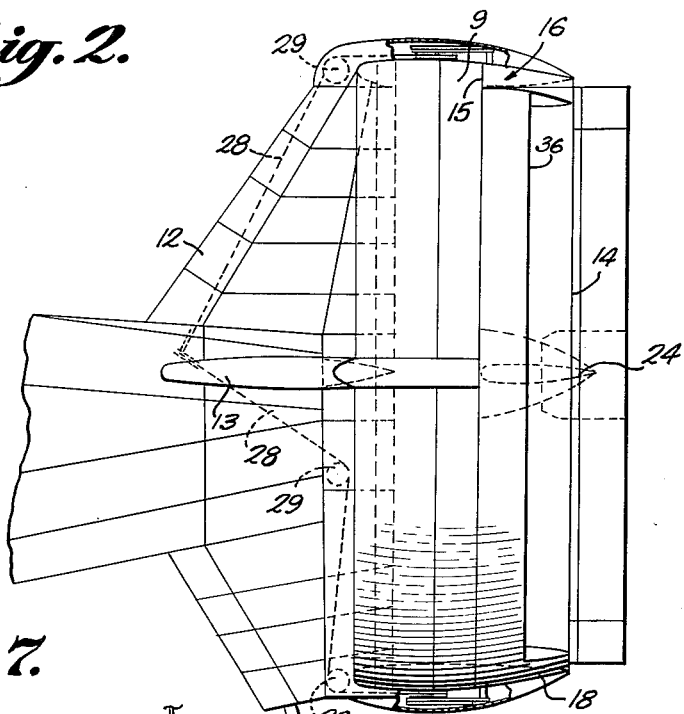
FIGURE 2 is an enlarged side elevation of the tail structure shown in FIGURE 1, parts being broken away.
Figure 3:
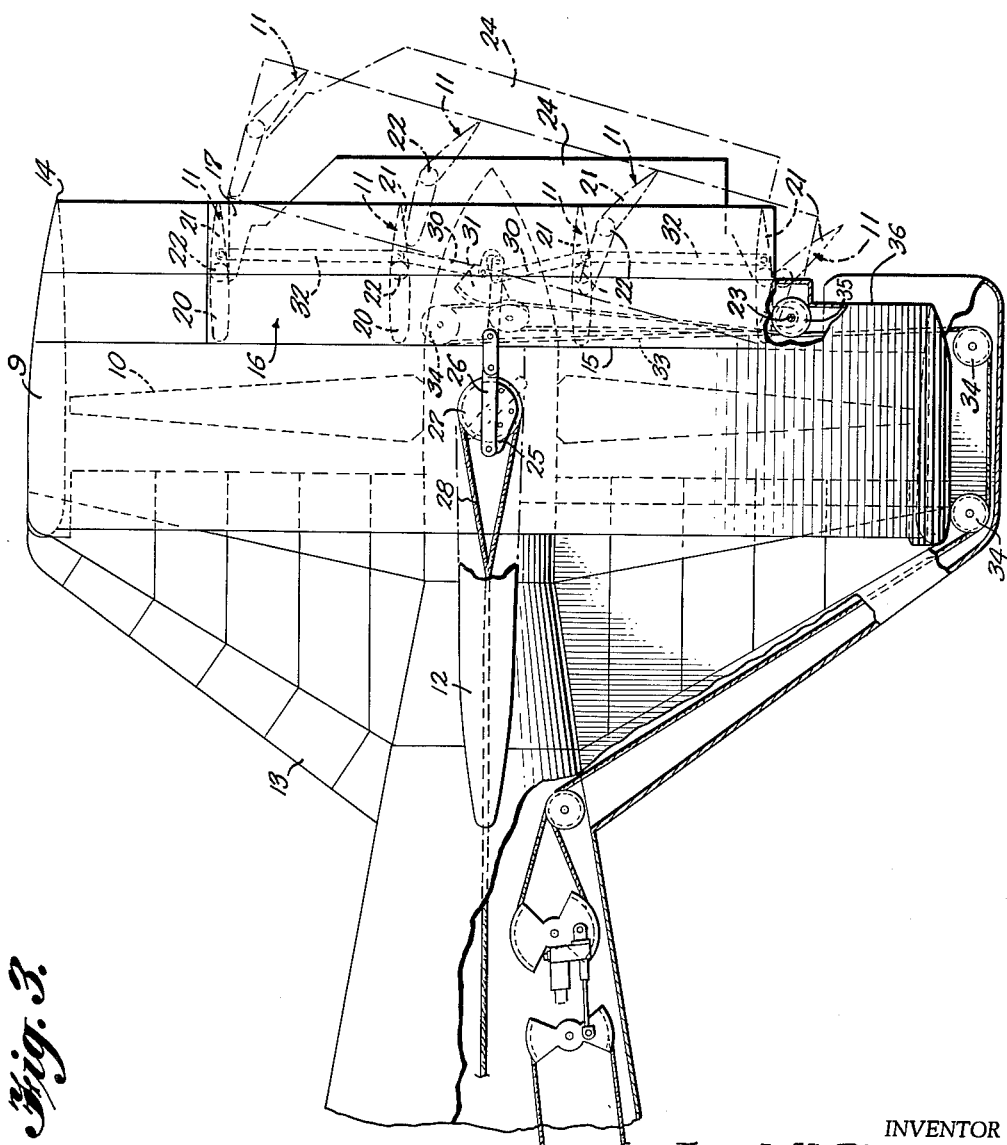
FIGURE 3 is a top plan view, on a further enlarged scale, of the structure shown in FIGURE 2, parts being broken away for clarity.
Figure 4:
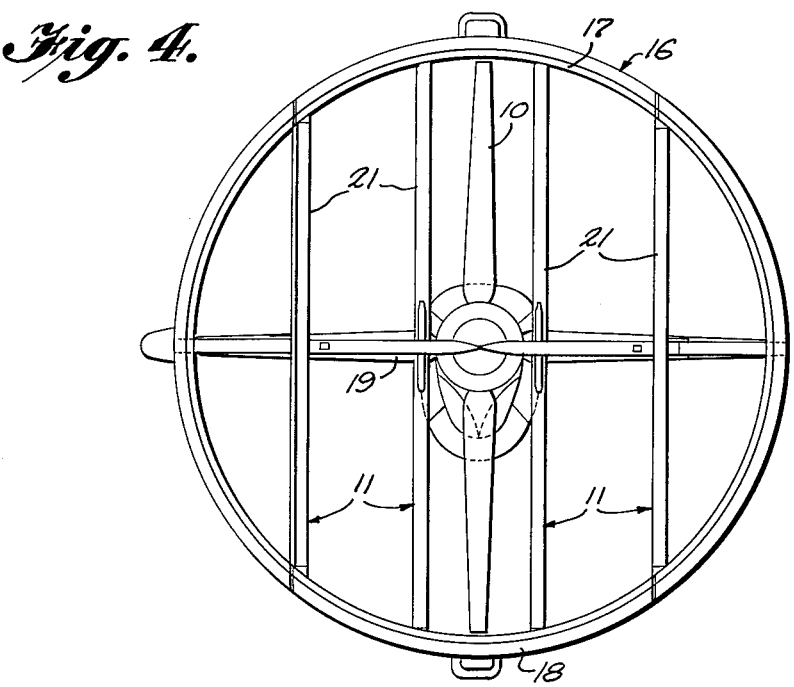
FIGURE 4 is a rear elevation of the tail.

Gate 16 may be moved about its pivot, the vane sections 21 may be angularly adjusted relative to the fixed sections 20, and the trim tab 24 may be tilted by any conventional control means. By way of illustration, the gate may be swung to an angular position for hovering flight control and back to its seat in the shroud for cruising flight control by means of a crank and link arrangement, as shown in FIGURES 2 and 3. This consists of similar cranks 25 and links 26 at the top and bottom of the shroud. Links 26 are coupled between the crank arms and the trailing edges of the gate. Consequently, when the cranks are rotated the gate will swing in or out. The cranks will be connected to pulleys 27, and control cables 28 will be trained about these pulleys and over pulleys 29 where necessary to lead the cables to a suitable operating control in the cabin.

The vane sections 21 may be controlled by means of links 30 connected to the inner vanes and to a pulley sector 31, pivotally mounted at the middle of the central member 19 of the gate. The inner vanes can be connected to the outer ones by links 32. In this way, the vanes will move in unison when the pulley sector is rocked in either direction. Cables 33 will be fastened to the pulley sector and carried about suitable pulleys 34 to the cabin where they will be connected to the rudder pedals. In order to assure accurate control of the vanes in both positions of the gate, the cables 33 will be trained about pulleys 35 on the hinge axis of the gate.

In operating aircraft equipped with the improved tail assembly, the gate 16 will be moved to retracted, or closed, position when the aircraft is in cruising flight. Vanes 21 will lie parallel to the longitudinal axis of the craft when in straight forward motion. The craft can be controlled by using the vanes as rudders and deflecting them to change course. The vanes lie within the shroud, directly in the slip stream of the propeller 10, which in this condition is the principal propelling force for the aircraft. As the air is confined by the shroud, or duct, its full force is effective against the vanes.

As the cruising speed is slowed, or for vertical lift, or any hovering flight, the gate 16 will be opened, or swung outwardly about its pivot to assume the angular position shown in dotted lines in FIGURE 3. This places the vanes at an angle to the longitudinal axis of the aircraft, so that as the lifting thrust is put upon the rotor 4, the propeller 10 will cause an anti-torque force to be exerted against the vanes to control fuselage position and direction. Movement of the rudder pedals will turn the movable vane sections 21 to change the camber of the vanes and vary the anti-torque effect of the tail assembly. By shifting the entire gate, the angle of the fixed vane sections relative to the longitudinal axis of the aircraft is changed to position properly for anti-torque action, without movement of the rudder pedal. This leaves the full pedal action for control. At the same time, the bank of vanes no longer lies at right angles to the craft axis but is inclined thereto. This will permit deflection of the movable vane sections without appreciable reduction of the air flow space between vanes. In order to prevent reduction in air space between the vane adjacent the gate pivot and the fixed part of the shroud, the shroud trailing edge is cut back, as at 36.

Figure 7:
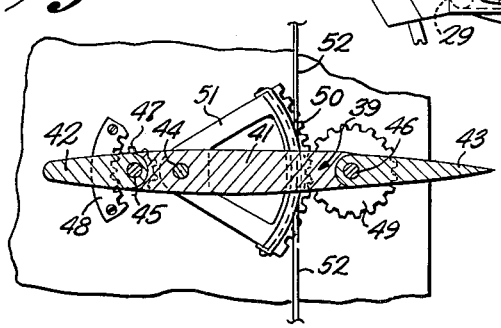
FIGURE 7 is a detail view illustrating one means of operation of the several vane sections of the vanes shown in FIGURES 5 and 6.
Figure 5:
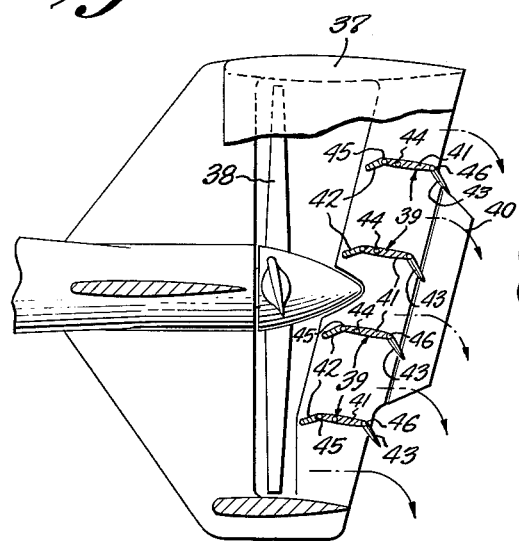
FIGURE 5 is a horizontal section through a modified tail structure, the vanes being shown in position for anti-torque control during hovering.
Figure 6:
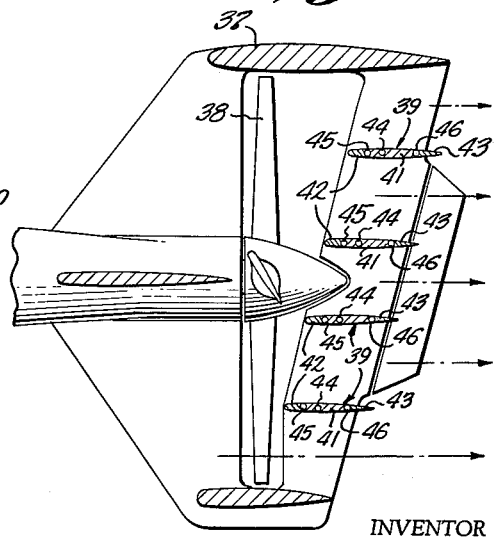
FIGURE 6 is a view similar to FIGURE 5 but with the vanes set for cruising control.

The tail assembly shown in FIGURES 5, 6 and 7 differs from that just described in that it does not contain a movable gate. In this form, the shroud 37 is also circular and has an airfoil cross-section. The shroud is not of uniform depth throughout, but tapers from one side to the other. The propeller 38 spans the interior of the shroud as before. The vanes 39 are mounted upon a horizontal strut which spans the shroud at its trailing edge. The strut is fixed in place, and the angle of the strut approximates the open-gate position of the form previously described. A horizontal trim tab 40 is hingedly connected to the trailing edge of the strut.

There are four vanes 39, as before, but in this form of the invention each vane consists of three sections, a main section 41, a leading section 42, and a trailing section 43. The vanes will be arranged above and below the strut, between the strut and the shroud top and bottom. The main section of each vane will be pivoted, as at 44, to the strut and the shroud. The leading and trailing tab sections are hinged at 45 and 46 to the main section.

Any suitable controls may be used to move the vanes. For example, the main sections may be turned about their pivots 44 by means such as that shown in the first-described form for deflecting the movable vanes 21. When the main section is tilted, the leading and trailing tab sections are turned automatically to increase or decrease vane camber. This may be done as shown in FIGURE 7. Leading tab section 42 may have a gear 47 fixed to its pivot pin 45, which is in engagement with a gear track 48 fixed to the strut. Trailing tab 43 has a gear 49 fixed to its pivot 46 and in engagement with a gear track 50. When the main vane section is turned about its pivot, the gears 47 and 49 will be caused to move along their respective gear tracks, thus rotating the gears and turning the vane tabs. By predetermined selection of gear and gear track ratios, the tabs can be caused to deflect at any desired rate relative to the main section and to each other. Gear track 50 may be carried by a pulley sector 51 freely mounted on pivot 44. Cables 52 can be connected to the sector so that the trailing tab can be moved independently for flight control. When the sector is held motionless and the main vane section turned, the trailing tab will turn automatically. When cables are operated to turn the sector the trailing tab will be moved as desired.

In operating this form of tail assembly, the vanes will be turned at an angle to the longitudinal axis of the aircraft and cambered for hovering flight. This position is shown in FIGURE 5. Directional control may be had by moving the trailing tabs. When the aircraft is cruising, the vanes will be in parallel alignment with the longitudinal axis of the aircraft. In cruising flight, the trailing tabs will be used as rudders.

Figure 8:
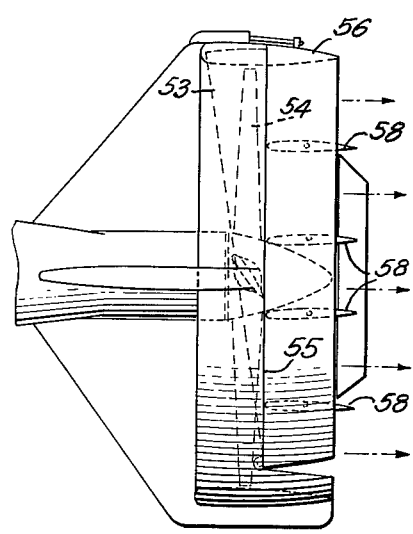
FIGURE 8 is a top plan view of a further modified form of tail assembly, shown in position for cruising control.
Figure 9:
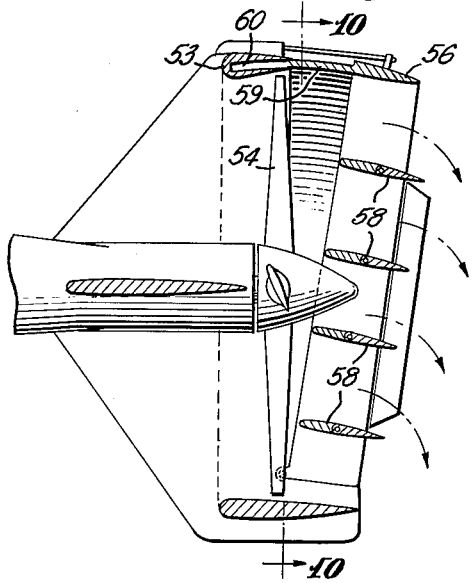
FIGURE 9 is a horizontal section through the structure shown in FIGURE 8 moved to hovering control position.
Figure 10:
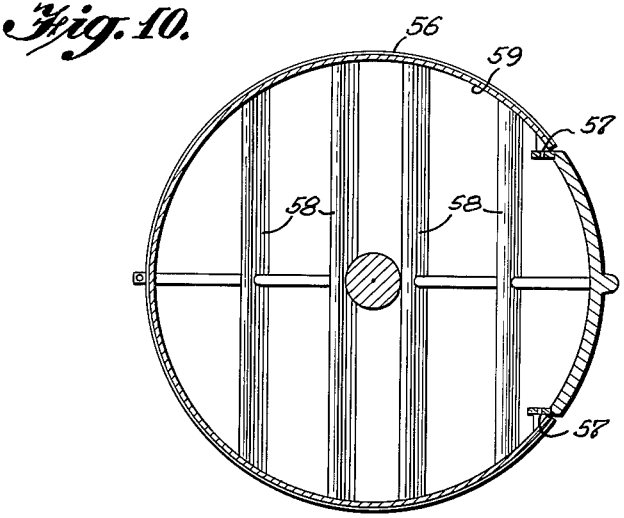
FIGURE 10 is a vertical section through the tail assembly, taken on the line 10—10 of FIGURE 9.

Turning now to FIGURES 8, 9 and 10, there is shown another tail assembly which, to some extent, combines the features of the two previously described forms. In this embodiment, there is a movable gate, but means are provided to prevent the loss of air flow control when the gate is opened.

The drawings show a shroud 53 having a propeller 54 mounted for rotation within it. The shroud has a cutout seat 55, and a gate 56 is pivoted at 57 to the shroud to swing in and out of the shroud seat. The gate carries vanes 58 which may be either the type shown in FIGURES 2, 3 and 4, or FIGURES 5, 6 and 7. This form of tail differs from the others in having an apron 59 attached to the leading edge of the gate and slidable in and out of a pocket 60 in the shroud. When the gate is swung outwardly, the apron will be drawn from the pocket to provide a bridge over the space between the gate and shroud. When the gate is retracted, the apron telescopes into the pocket in the shroud.

In this last described form of the invention, the parts will have controls similar to the ones previously described. The operation will be the same as that of the first-described form.

While in the above several practical embodiments of the invention have been disclosed, it will be understood that the precise details of construction shown and described are merely by way of example, and the invention may take other forms within the scope of the appended claims.

What is claimed is:

1. Slip stream deflector assembly for aircraft comprising, an annular shroud having leading and trailing edges, a propeller mounted within the shroud for rotation concentrically of the shroud, a vane support fixedly mounted on the shroud adjacent the trailing edge of the shroud rearwardly of the propeller, a plurality of vertical vanes mounted on the support each having a leading edge with the leading edges of all the vanes lying in a common plane, each vane having leading, central and trailing sections, means pivotally interconnecting the three vane sections, means pivotally connecting the central vane sections to the support, means intercoupling the vane sections to cause simultaneous movement of the leading and trailing vane sections when the central section is moved about its pivot to change the camber of the vanes, and means to move the central vane sections about their pivots.

2. Slip stream deflector assembly for aircraft comprising, an annular shroud having leading and trailing edges, a propeller mounted within the shroud for rotation concentrically of the shroud, a vane support mounted on the shroud adjacent the trailing edge of the shroud rearwardly of the propeller, a plurality of vertical vanes mounted on the support each having a leading edge with the leading edges of all the vanes lying in a common plane, each vane having leading, central and trailing sections, means pivotally interconnecting the three vane sections, means pivotally connecting the central vane sections to the support, means intercoupling the vane sections to cause simultaneous movement of the leading and trailing vane sections when the central section is moved about its pivot to change the camber of the vanes, and means to move the central vane sections about their pivots.

3. Slip stream deflector assembly for aircraft as claimed in claim 2 wherein, there is means to move the trailing vane sections independently of the leading and central sections.

4. Slip stream deflector assembly for aircraft as claimed in claim 2 wherein, the vane support carries a vertically tiltable horizontal trim tab.

5. Slip stream deflector assembly for aircraft comprising, an annular shroud having leading and trailing edges, a propeller mounted within the shroud for rotation concentrically of the shroud, a vane support in the form of a swingable gate pivoted along a vertical axis at one side of the gate adjacent the trailing edge of the shroud rearwardly of the propeller, the gate having a position parallel to the plane of rotation of the propeller and a position at an angle to the plane of rotation of the propeller, means to move the gate from its position at an angle to the plane of rotation of the propeller to its position parallel thereto and back, a plurality of vertical vanes mounted on the support each having a leading edge with the leading edges of all of the vanes lying in a vertical plane transversely of the gate, each vane having leading, central and trailing sections, means pivotally interconnecting the three vane sections, means pivotally connecting the central vane sections to the support, means intercoupling the vane sections to cause simultaneous movement of the leading and trailing vane sections when the central section is moved about its pivot to change the camber of the vanes, and means to move the central vane sections about their pivots.

6. Slip stream deflector assembly for aircraft as claimed in claim 5 wherein, there is means to move the trailing vane sections independently of the leading and central sections.

References Cited by the Examiner
UNITED STATES PATENTS

| | | | |
|---|---|---|---|
| 2,740,597 | 4/1956 | Wittman | 244—44 |
| 2,918,230 | 12/1959 | Lippisch | 244—23 |
| 2,929,580 | 3/1960 | Ciolkosz | 244—12 |
| 3,026,068 | 3/1962 | Spearman | 244—17.19 X |
| 3,041,830 | 7/1962 | Thomas et al. | 244—52 X |
| 3,061,242 | 10/1962 | Zurawinski et al. | 244—23 |
| 3,100,377 | 8/1963 | Kosin et al. | 244—23 X |

FERGUS S. MIDDLETON, *Primary Examiner.*